Feb. 10, 1925.

E. J. KANE 1,525,940

MOTOR VEHICLE

Filed Aug. 8, 1919  6 Sheets-Sheet 1

Fig. 1.

INVENTOR.
Edmund Joseph Kane
BY Arthur L Sprinkle
ATTORNEY

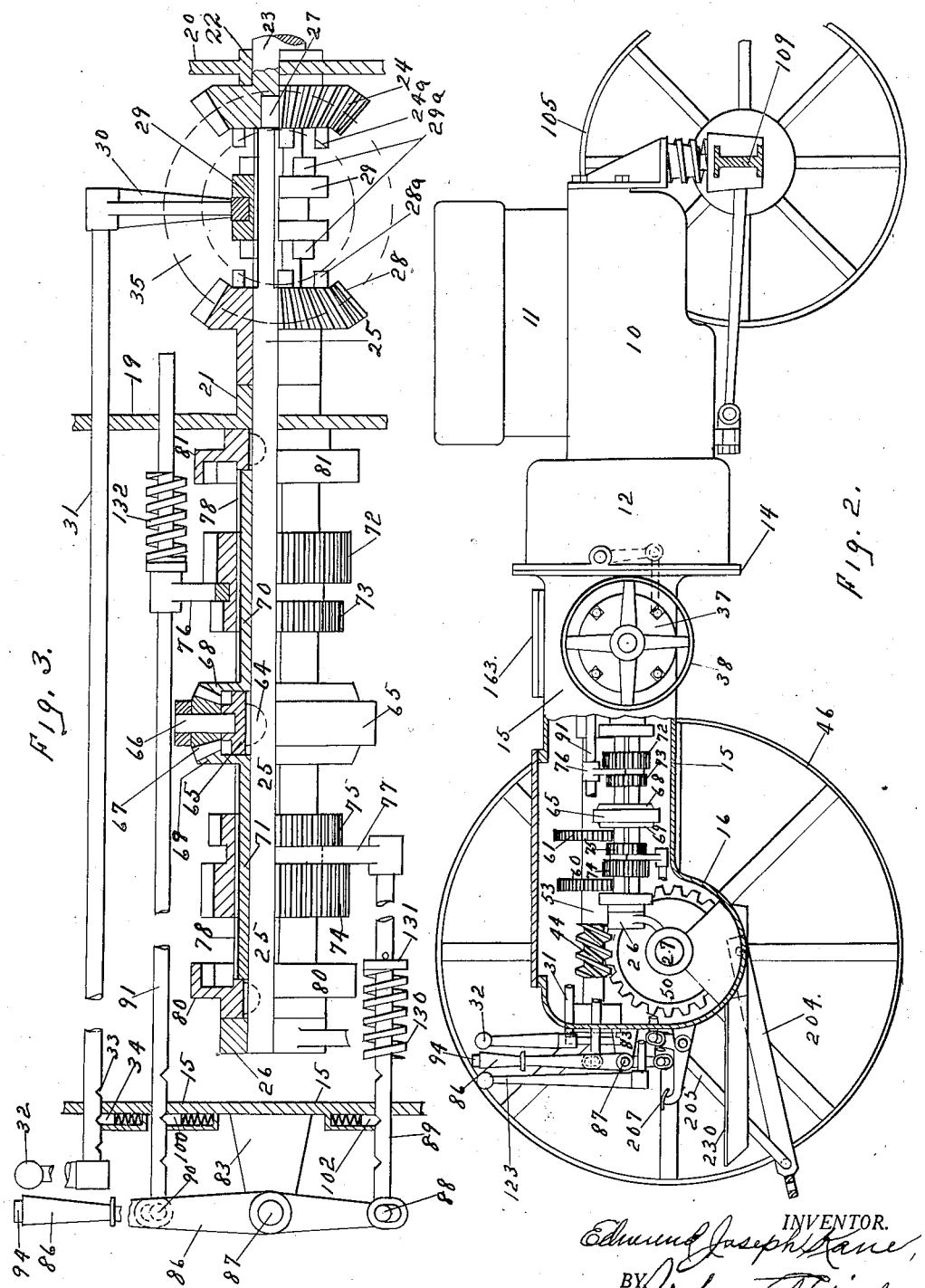

Feb. 10, 1925. 1,525,940
E. J. KANE
MOTOR VEHICLE
Filed Aug. 8, 1919 6 Sheets-Sheet 3
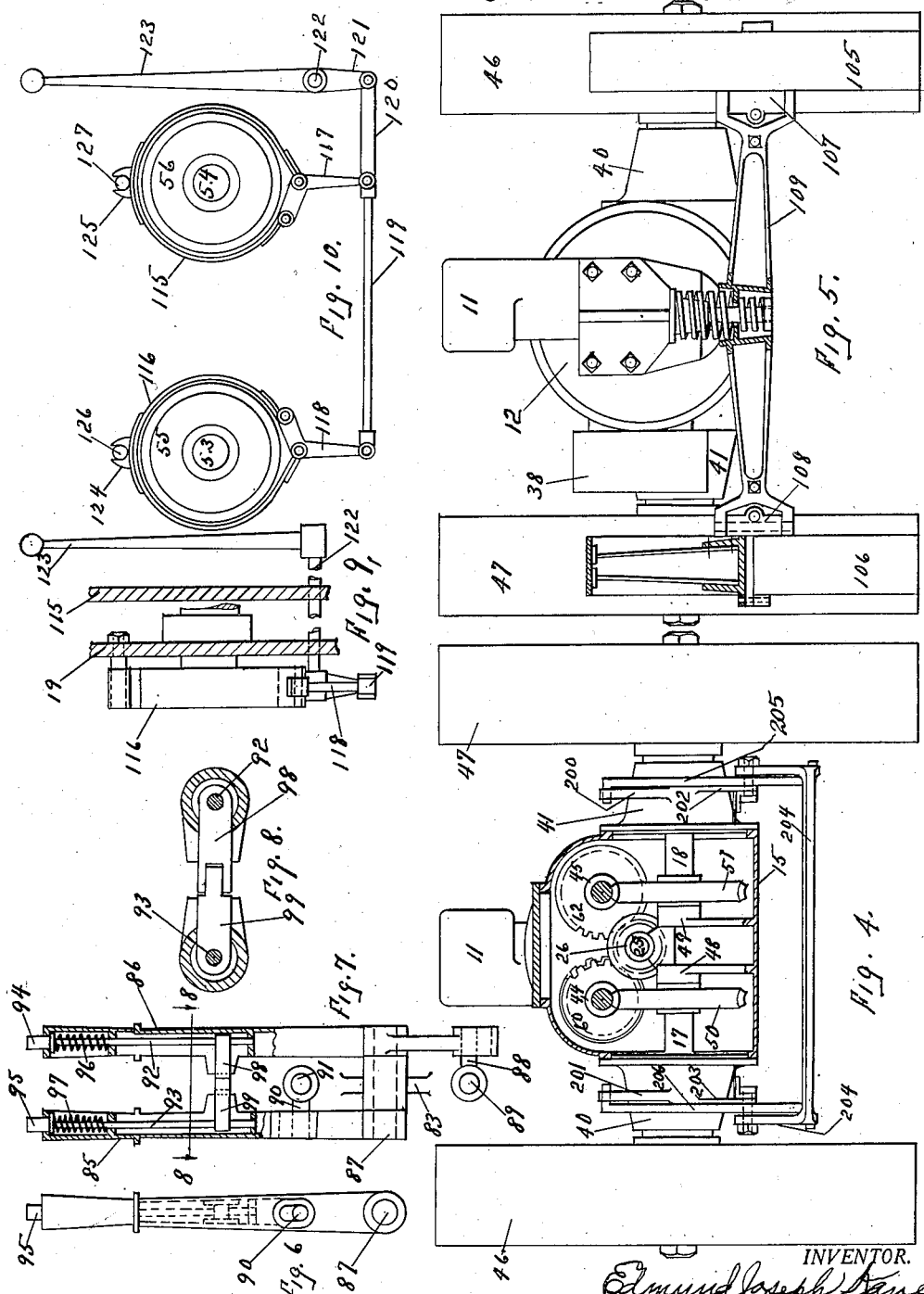
INVENTOR.
Edmund Joseph Kane
BY Arthur L. Sprinkle
ATTORNEY

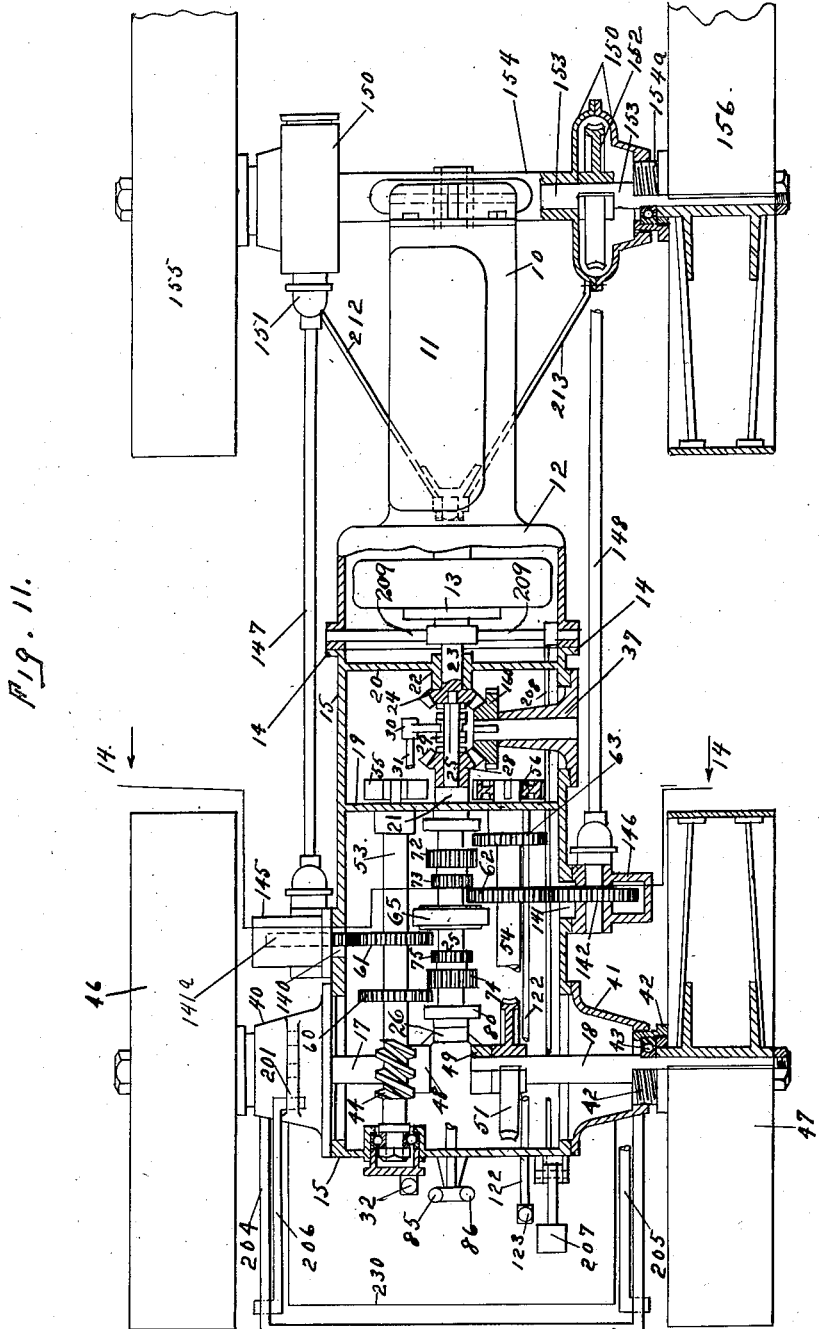

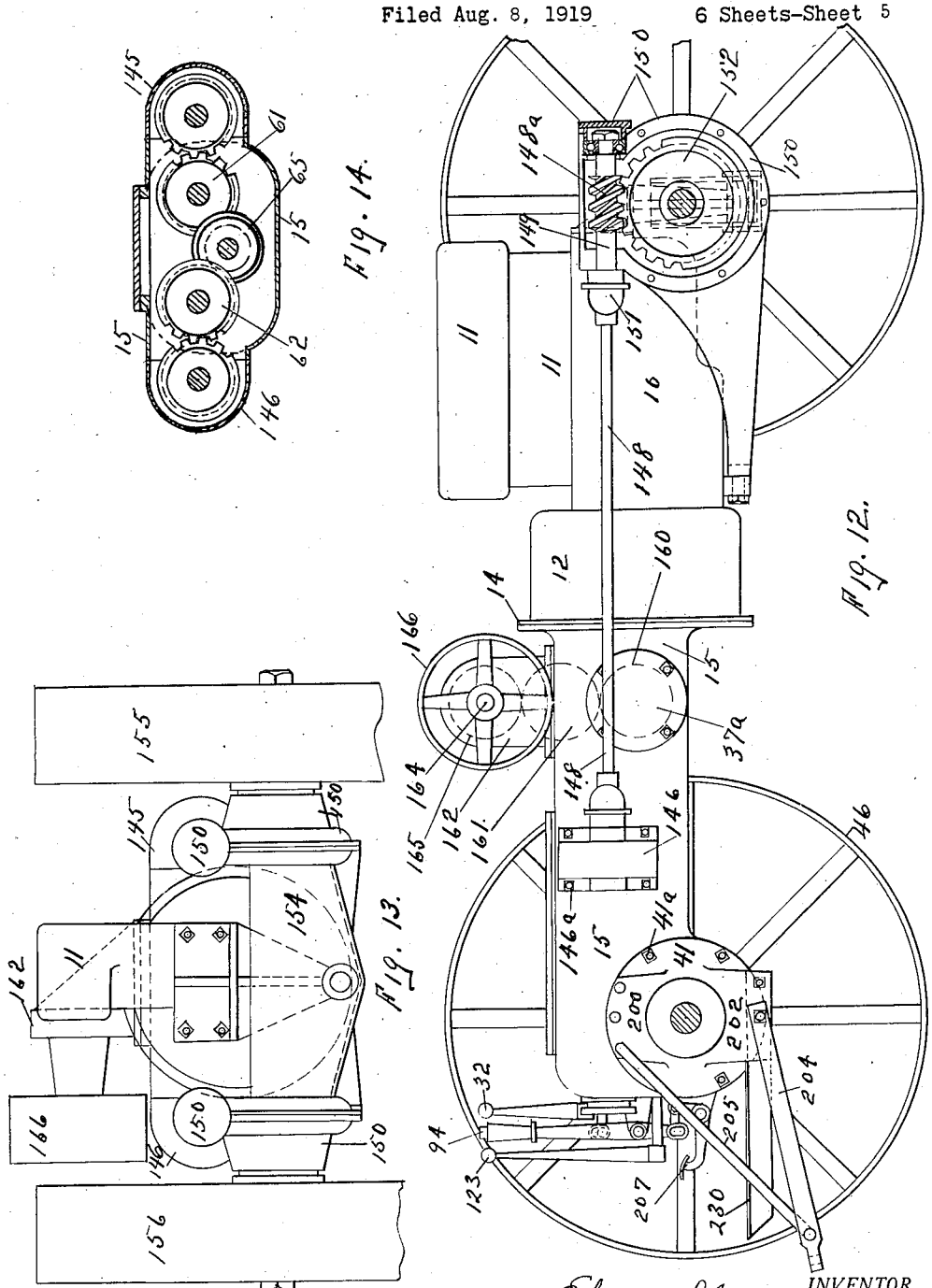

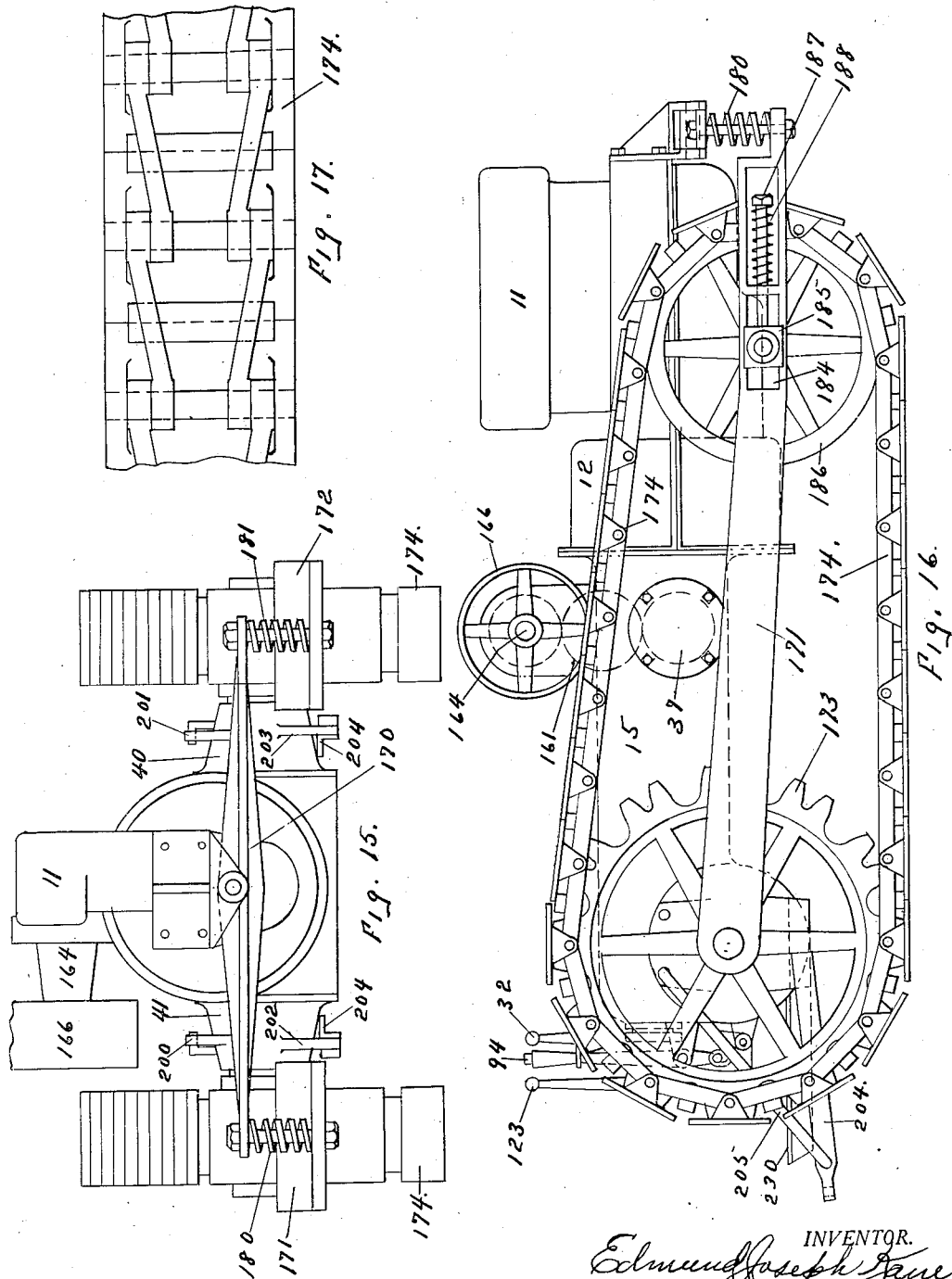

Patented Feb. 10, 1925.

1,525,940

UNITED STATES PATENT OFFICE.

EDMUND JOSEPH KANE, OF CHICAGO, ILLINOIS.

MOTOR VEHICLE.

Application filed August 8, 1919. Serial No. 316,132.

*To all whom it may concern:*

Be it known that I, EDMUND JOSEPH KANE, a citizen of the United States, residing at Chicago, in the county of Cook and State of Illinois, have invented certain new and useful Improvements in Motor Vehicles, of which the following is a specification.

The invention relates to power driven vehicles designed for hauling or draft purposes as motor trucks or farm tractors and more particularly relates to the driving mechanism by which power is imparted from a motor or other prime mover on the vehicle to the sustaining and driving devices of the vehicle.

The primary object of the invention is to provide improved mechanism for imparting motion from the motor to the driving and sustaining devices of the vehicle.

It is one of the objects of the invention to provide improved driving mechanism to each of the four wheels of a motor vehicle in such manner that the steering of the vehicle may be expedited to the extent that the vehicle may be guided or even turned without the necessity of pivotally mounting any of the axles supporting the driving wheels.

It is a further object of the invention to provide improved means in connection with the power transmission devices between the motor and driving wheels of my improved motor vehicle by which one of the driving wheels may be locked or frictionally held against rotation in either direction while at the same time all the power may be transmitted from the motor through the driving mechanism to the other driving wheel or wheels in a forward or backward direction as desired. Such a construction is of importance with either trucks or farm tractors where the condition of road or soil is uncertain with respect to one or more of the driving wheels while the other wheel or wheels may be on ground that will afford traction surface.

It is a further object of the invention to provide an improved form of power transmission and driving mechanism for motor vehicles or trucks which may by adding or taking away from the structure certain parts adapt such standard unit to a motor vehicle of either the two or four-wheel drive type of either the wheeled type of motor vehicle or the endless belt type of tractor vehicle sometimes referred to as the track layer or type of drive for motor vehicles.

It is a further object of the invention to provide in a motor vehicle, having differential mechanism interposed between the power transmission devices and separated driving devices or wheels, a means under the control of the operator for rendering the differential mechanism inoperative with the variable parts thereof locked together by which power will be transmitted at equal speeds alike to the separated driving devices or wheels, and also a further means out of control of the operator, of an automatic character, by which the said differential mechanism will be restored to its normal mode of operation when the emergency which makes desirable the locking out of the differential has passed.

It is a further object of the invention to provide in a motor vehicle having differential mechanism interposed between the source of power and transmitting device or wheels on opposite sides of the vehicle an improved braking or locking device adapted to lock or to brake the driving devices or wheels on either side of the vehicle at will, the said mechanism being operative by a controlling lever arranged preferably to lock the driving device or wheels on one side of the vehicle and releasing the same on the opposite side of the vehicle, the locking of the device being preferably on that side of the vehicle to which the shiftable or hand engaging portion of the lever is thrown.

It is a further object of the invention to provide in a vehicle having power transmission mechanism of the character described improved means for controlling the said power transmission devices, under the control of the operator.

It is a further object of the invention to provide, in a vehicle of the character described, an improved frame by which the operating parts of the motor, clutch and power transmission devices, including the bearing supports for the rear axle, are mounted upon and contained in and by said frame in the form of a unitary structure, thus avoiding the necessity for providing any additional vehicle frame, the said unitary structure or frame providing means for the attachment of all of the moving parts of the vehicle, including motor, power transmission, driving wheels and axles therefor.

It is generally recognized that for ordinary use the two-wheel drive type of tractor using the ordinary rigid round wheels, as distinguished from tractors of the tracklaying type, is most satisfactory, but it is also well known that there are many conditions in which the ordinary type of tractor is very deficient and unsatisfactory, and in order to overcome these difficulties with the ordinary two-wheel drive machine, changes in the design of the same are very expensive, and in some instances manufacturers are compelled to make a number of entirely different types of tractors, with the result that the cost is multiplied with the multiplication of the necessary tools, dies, jigs, patterns, etc. made necessary by the manufacture of separate and distinct types.

It is one of the chief objects of this invention to overcome these difficulties and to enable a manufacturer to make a unit of power plant and frame combined without any additional underframe or subframe; that may with very slight and inexpensive changes be adapted for sale as either a two-wheel drive or a four-wheel drive tractor and may also be equipped with the endless belt or tracklaying type of drive. Under present conditions manufacturers of two-wheel drive tractors find it necessary in meeting special conditions of soft ground, sand, etc., to make an entirely new chassis including power plant, frame, etc., when putting out machines of the four-wheel drive or track-layer type, as distinguished from the two-wheel drive, with consequent multiplication of manufacturing equipment, which is very expensive, and making it also necessary for dealers to go to the trouble and expense of carrying double or triple sets of repair parts.

It is true that it would be possible to modify some of the present four-wheel drive tractors so that they could be sold as two-wheel drive machines, but in such cases it would result in the reconstructed two-wheel drive machine being too complicated and expensive to compete with other two-wheel drive tractors on the market, whereas a machine constructed in accordance with the principles of my invention lends itself readily to adaptations and sales under all conditions referred to with a minimum of changes and expense. One of the weakest points in tractors as at present constructed lies in the ordinary use of the differential between the driving wheels on the two sides of the machine whereby when one of the wheels gets in soft ground it is caused to spin around with the result that the wheel will sink deeper and deeper into soft ground or mud and finally become lodged so that it is impossible to extricate the machine under its own power. It is true that on a very few tractors as at present constructed there are provided differential locks in the attempt to overcome this difficulty, but such locks as heretofore constructed add greatly to the cost of manufacture and make the operation of the machine more difficult. At the same time there is the further danger that the differential may be left locked by the operator when turning a corner and serious breakage of the machine result. To overcome these objections and to refine the differential locking mechanism is one of the objects of my invention and I utilize the same means that I use for shifting the change speed gears to lock the differential, thus making it exceedingly simple to operate. I provide also spring means which automatically releases the differential lock and prevents any possible breakage, such spring means operating to restore the differential lock to normal unless the operator positively holds the locking means in engagement.

Another object of the invention is to provide a tractor of the character described having brakes with an improved brake operating means having a lever control whereby the brake on one side of the differential may be engaged to brake its co-operating wheel, while the braking mechanism on the other is out of engagement or inoperative. This is desirable when steering a machine constructed as a four-wheel drive and to assist in steering the machine when assembled as the two-wheel drive or equipped as a tracklaying type of machine, the brake lever being preferably arranged so that it will be moved toward the side of the tractor toward which it is desired that the same shall be steered.

It is a further object of the invention to provide in a tractor of the described character a novel means of power transmission, comprising slide gears connected with variable parts of the differential and adapted to engage gears on separated driving shafts, together with means for moving the slide gears toward or away from each other by the like movement of two levers, said levers being so constructed and arranged as normally to act as a single lever, but being detachable and releasable from each other by means under the control of the operator whereby either lever may be moved independently of the other to move its corresponding set of gears independently of the gears connected with the other lever, means being provided in connection with said levers for locking both sides of the differential simultaneously, or each side separately or independently of the other by movement of the corresponding one of the levers.

It is also an object of the invention to provide an arrangement of beveled gears mounted on the main driving shaft between the motor clutch and the power transmission gearing, for reversing the direction of rotation of the power transmission devices and consequently reversing the direction of travel of the tractor; which said gears may be utilized for driving the usual power pulley by the simple shifting of a jaw clutch.

It is a further object of the invention to provide a machine of the described character provided with worm gears for operating the driving wheels, said worm gears being on the inside of a power transmission casing with means for lateral adjustment of the said worm gears from the outside of the transmission casing.

It is a further object of the invention to provide in a tractor of the described character having a unitary power transmission and rear axle casing improved draw bar supporting mechanism constructed independently of the main frame casting whereby any breakages of the draw bar or its supporting means may be easily and economically replaced.

It is a further object of the invention to provide means for steering a tractor of the four-wheel drive or track laying type having rigid axles, first by the provision of means for holding one side of the differential when a small turn is desired and, secondly, by providing suitable means for applying all the power from the power plant to the driving wheels or driving mechanism on one side of the machine and at the same time braking the driving wheels or driving mechanism on the other side when a quick turn of the tractor is desired.

Other objects of the invention will appear from the following description which is directed to the preferred embodiments thereof and in which reference is made to the drawings also forming a part of the specification.

In the said drawings, Fig. 1 is a top plan view of a motor driven vehicle of the form of farm tractor adapted particularly for plowing or other agricultural purposes, the integral frame of the tractor to the rear of the motor being shown in longitudinal and horizontal section to disclose the details of the power transmitting devices. The invention is shown in this view as applied to drive the two rear wheels of the vehicle.

Fig. 2 is a side elevation view of the tractor vehicle of Fig. 1 with a part of the casing at the rear end thereof in vertical longitudinal section and parts of the mechanism therein omitted or broken away to disclose the details of construction.

Fig. 3 is a detail view with parts in section of the power transmitting mechanism to the rear of the clutch and showing the details of the controlling mechanism therefor.

Fig. 4 is a rear elevation of the tractor vehicle of Figs. 1 and 2 with parts of the main casing and the driving shafts therein in section.

Fig. 5 is a front elevation of the machine of Figs. 1 to 4 inclusive with parts in section to disclose details of construction.

Figs. 6 to 8 inclusive are detail views with parts in section illustrating the construction of the controls for the power transmitting device, Fig. 8, the latter being a sectional view on line 8—8 of Fig. 7.

Figs. 9 and 10 are detail views of the frictional brake mechanism for controlling the power transmission devices being utilized for ordinary braking purposes as well as for steering control as hereinafter described.

Fig. 11 is a view similar to Fig. 1 of a modified form of the invention in which additional mechanism is shown attached thereto for the purpose of driving the two front wheels of the vehicle thus converting the standard machine of Fig. 1 into a four-wheel drive tractor.

Fig. 12 is a side elevation of the machine of Fig. 11 with two of the supporting and driving wheels on the side of the vehicle removed and with the axles and a part of the front driving mechanism in section to disclose details of construction.

Fig. 13 is a front elevation view of the machine of the four-wheel type shown in Figs. 11 and 12.

Fig. 14 is a transverse vertical sectional view through the power transmission device taken approximately on the broken line 14—14 of Fig. 11.

Figs. 15 and 16 are front and side elevation views respectively of a track laying or endless belt type of tractor vehicle in which the main features of my invention are applied.

Fig. 17 is a detail fragmental view of an endless belt or track adapted to be used in connection with the machine of Figs. 15 and 16.

In my patents of the United States Nos. 1,306,227 and 1,306,065 of June 10, 1919, I show and claim broadly the form of driving mechanism which is followed in the present invention, the structures shown herein being in the nature of improvements and refinements to better adapt the structure shown in my said prior patents for satisfactory commercial use including greater economy and facility in manufacture.

The preferred mode of constructing the main frame of my motor vehicle is shown in Figs. 1, 2, 4, 5 and 11 to 15 inclusive from which it will be seen that I prefer to provide the main frame of unitary structure designed to support the axles of the machine and to carry on the interior thereof in suitable lubricating bath compartments the principal operating parts of the machine including motor and power transmission devices, thus rendering such mechanisms as compact as possible, improving the appearance of the machine, covering up as far as possible all moving parts that might be harmful when exposed, and insuring proper lubrication by excluding all foreign materials which interfere with the proper operations of such mechanisms as dust and the like.

To this end I prefer to combine the housing or frame of my power plant with a suitable housing or frame having space or spaces on its hollow interior for containing substantially all of my power transmission mechanism, including the rear axle, all in a unitary structure, either in the form of an integral casting or made up of sections suitably connected or joined together, thus avoiding the necessity of providing any framework beyond the casings for sustaining the power plant and the power transmission devices. The preferred form or motive power for my vehicle is that of the gas or gasoline engine which may be of any conventional type and a suitable frame for one form of which is indicated by the reference character 10, 11 indicating the cylinder portion of the engine which has connected integrally with the rear end of the casing 10 thereof the bell housing 12 in which is contained suitable clutch mechanism as indicated by the reference character 13 for transmitting the power through a main drive shaft from the motor to the power transmission devices which control the application of the power to the driving wheels or other means for supporting and propelling the vehicle.

Connected with the bell housing clutch casing 12 of the motor and extending rearwardly therefrom either as an integral casting or secured by a suitable flanged connection as indicated at 14, (Figs. 1, 2, 11 and 12) and forming an extension of the clutch casing is a hollow casing for containing the power transmission devices, the same being indicated generally by the reference character 15, and having formed integrally therewith on the underside an extension or enlargement as indicated at 16 for properly supporting the sections 17 and 18 of the divided rear axle. In the drawings the flanged parts as indicated at 14 by which the clutch casing of the engine frame may be connected with the frame at the rear for the power transmission devices are shown for the purpose of simplicity in the drawings without the usual connecting bolts which obviously, will be provided when it is desired to form the engine and power transmission frames by separate manufacturing operations.

The power transmission casing 15 will preferably be provided with transversely extending walls 19, 20 spaced apart, to the rear of the clutch casing, to provide means for supporting suitable bearings 21, 22 for supporting that portion of the main drive shaft to the rear of the clutch 13, the latter being divided shortly after it passes to the rear through the bearing 22, this porton of the drive shaft being designated by the reference character 23 and having formed integrally thereon or connected rigidly therewith a bevelled gear 24 adapted to be utilized in connecting the clutch section of the main drive shaft with the power transmission section thereof, the latter being designated by the reference character 25, and extending through the bearing 21 in the wall 19 of the power transmission casing rearwardly through the casing to a point near the rear end wall of the casing where it is rotatably supported in a bearing preferably formed as an integral part of the casing and designated by the reference character 26. The section 25 of the main drive shaft may be provided with a reduced extension or trunnion at its forward end as indicated by the reference character 27 adapted to cooperate with an opening at the center of the gear 24 to enable the section 25 of the drive shaft to rotate either with or independently of the section 23 thereof. This construction is for the purpose of providing mechanism for reversing the direction of rotation of the section 25 of the main drive shaft, the same consisting of a bevel gear 28 which like its companion gear 24 is mounted on a section of the drive shaft, both gears 24 and 28 being provided on their opposite inner faces with jaw clutch teeth $24^a$ and $28^a$ respectively, adapted to be engaged by clutch teeth $29^a$ of the sliding clutch member 29 which is slidably mounted on shaft 25 between the said bevelled gears, being splined thereon to cause it to continuously rotate therewith and controlled in its longitudinal movement on the shaft by the shifter fork 30, which is connected through link or rod 31 with a suitable hand lever 32 pivoted to one part of the frame 15 near the rear thereof to be accessible to the operator. The rod 31 may consequently be provided with suitable notches as indicated at 33 where it passes through a slide bearing in the rear wall of the casing 15 so that a spring pressed detent 34 supported by the wall of the casing or in some suitable manner will engage the notches 33 in rod 31 and hold it in either of the notches 33 of which there are three, for the purpose of providing three adjustments of clutch member 29 as follows:

First. When the clutch 29 is shifted so that the jaws or teeth 29ª will engage the jaws or teeth 24ª on the bevel clutch pinion 24 rigidly secured to the main drive shaft 23, it will be seen that the section 25 of the drive shaft will rotate positively with the section 23 of the drive shaft and consequently in the same direction as the motor and clutch providing what will preferably be the forward drive of the machine.

Second. When the shifter fork 30 is moved through hand lever 32 to carry the clutch member 29 to a position midway between the clutch gears 24 and 28 as illustrated by the positions of the parts in Fig. 3, obviously, the section 23 of the main drive shaft and the gear 24 thereon may rotate independently of the section 25 providing a neutral position for the power transmitting devices to the rear of this jaw clutch and reversing mechanism. In this construction it will be apparent that the bevel gear 28 with its clutch teeth 28ª thereon must be mounted to rotate loosely on the end of drive shaft section 25 and rotation to the gear 28 will be imparted by means of a bevel gear 35 mounted on a shaft 36 which is journalled on an axis at right angles to the axial line of the main drive shaft and supported in a suitable bearing block 37 secured in the wall of the casing 15, the extension of the shaft 36 as shown in Fig. 1 to the exterior of the casing being optional and affording a convenient means for the provision of a power pulley indicated by reference character 38, Figs. 1 and 2. The bearing block 37 is preferably made detachable, being secured to the engine frame by a plurality of removable bolts as indicated in Figs. 2, 12 and 16 for a purpose to be later described.

A third adjustment of the reverse clutch member 29 is provided by shifting it to a position where the jaws 29ª will engage with the jaws or teeth 28ª of the clutch gear 28. Obviously, this adjustment of the clutch will lock the section 25 of the drive shaft to rotate in the same direction as the constantly rotating bevel clutch gear 28, which being driven by the gear 35 normally rotates in the reverse direction from the clutch gear 24 on the forward section of the main drive shaft, resulting in a reversal of movement of the driving mechanism of the machine whenever the clutch 29 engages the clutch gear 28. On the shaft 25 in the power transmission casing is contained the differential mechanism and gearing for transmitting power to the driving wheels or driving mechanisms whether the vehicle be of the endless belt or solid wheel drive type of machine. The power transmission casing is preferably shaped near its rear extremity with hollow lateral projections as indicated at 40, 41 either formed integrally around openings within the lateral walls of the casing 15, or secured thereto around openings in said casings as indicated in the drawings. At the outer extremities of the hollow axle tubes or projections 40, 41 threaded heads are formed for taking the co-operating threaded adjusting nuts 42 which may be provided with suitable bearings or have secured thereto, as indicated in the drawings, Figs. 1 and 11 the antifriction bearings as indicated by reference character 43 for supporting the outer ends of the divided axle shafts 17, 18 which have the hubs of the driving wheels 46, 47 secured thereto for supporting and driving the frame of the machine at the rear thereof. On the inside of the casing 15 near the center thereof at the rear as indicated in Figs. 1, 2, 4 and 11 there are formed suitable bearings 48, 49 for the inner ends of shafts 17, 18, the same being preferably formed as integral extensions from the body of the casing 15. Gears 50, 51 are secured on the inner ends of axle shafts 17, 18 near the bearings 48, 49 and movement is imparted to these gears on the driving axles through worm gears 44, 45, which are mounted on supplemental drive shafts 53, 54 extending longitudinally of the transmission casing 15, and journalled in suitable bearings in the rear end wall of the casing 15 and in the partition 19 therein. The supplemental driving shafts 53, 54 are separated so that they lie on opposite sides of the main driving shaft 25. This construction admits of the use of spur gears for driving the supplementary shafts 53, 54 from the drive shaft 25 eliminating the use of bevel gears with their attendant expense and friction, thus following the construction of my prior patents referred to. The supplementary drive shafts 53, 54 are preferably extended forwardly of the partition 19 as illustrated in the drawings, where they are each provided with brake wheels 55, 56 (see Figs. 1 and 10), each provided with brake belts and operating mechanism therefor to be later described.

The drive shaft 25 in the power transmission casing 15 to the rear of the reversing gears 24, 28 is provided with gears fixed thereon to slide longitudinally for the purpose of engaging co-operating gears on the supplemental driving shafts 53, 54, there being preferably differential mechanism interposed between the two sets of gears for driving the wheels on opposite sides of the machine. Such a construction of differential and spur gear driving mechanism is shown generally in my prior patents, but I show herein certain improvements in the driving gear by which it is possible for the operator to render the differential mechanism inoperative in order to impart movement positively to the driving wheels or devices on both sides of the machine without any differential movement therebetween, which is a feature found to be important when the wheels or driving devices on one side of the vehicle are on soft or uncertain ground or road surface.

The vehicle shown herein is designed for use primarily as a farm tractor and hence I show in this embodiment of the invention only provision for driving the machine forwardly at two speeds and in the reverse direction at a corresponding number of speeds. 60 and 61 are gears of different sizes, the latter being larger than the former fixed to the supplemental driving shaft 53, while 62 and 63 are the corresponding gears fixed in a like manner to the supplementary driving shaft 54. Keyed to the shaft 25 at 64 is a differential gear hub 65 carrying preferably a plurality of studs 66 on which are journaled one or more bevel pinions toothed to engage co-operating bevel gears 68 and 69 making a differential gear mechanism of conventional form, the said bevel gears being secured to or preferably integrally formed as illustrated herein with the elongated sleeves 70, 71 which are journalled to rotate independently on drive shaft 25. Two pairs of gears 72, 73 and 74, 75, the gears of each pair being of different diameters, are mounted to slide along the sleeves 70, 71 but are keyed thereon so as to rotate therewith at all times. These gears are preferably, although not necessarily formed on an integral hub and are shown separated so as to form a groove therebetween for the reception of shifter forks 76, 77, by which the gears may be adjusted along the drive shaft as desired in operating the gear shifting mechanism, as hereinafter described, suitable splines for co-operating with the grooves in these gear hubs being indicated by the reference character 78, Fig. 3.

Keyed to shaft 25 at the extremities of the differential gear sleeves 70, 71 between the bearings 21 and 26 of shaft 25 are the internally toothed gears 80, 81 arranged so that the teeth therein extend over a part of the elongated sleeves of the differential gears so that the large sliding gears 72 and 74 which are toothed on their peripheries may engage corresponding teeth on the interior peripheries of the gears 80, 81.

For controlling the gear shift I provide a novel mechanism shown in detail in Figs. 3 and 6 to 8 inclusive. This comprises two pivoted hand levers, one for shifting the gears which engage the gears which drive each of the supplementary drive shafts 53, 54 arranged so that said levers may be normally locked in engagement to operate conjointly with each other to shift the gears in relation to driving each of the supplementary drive shafts for simultaneously or individually controlling the driving devices on the two sides of the machine.

This controlling mechanism comprises the companion levers 85, 86 located near each other and on the common pivotal center consisting of the pin 87 attached to the bracket 83 at the rear of the combined gear casing and machine frame 15. The lever 86 has a depending branch below the pivotal connection at 87, being slotted therein to receive the cross pin 88 on the rearward extremity of the rod 89, which latter extends through a hole in the rear wall of the casing 15 and has connections at its forward extremity with the gear shift fork 77 engaging gears 74, 75. The companion lever 85 in order to properly operate the gears 72, 73 is provided on the upper portion thereof some distance above the pivotal connection 87 with a slot which engages a trunnion or pin 90 at the rearward extremity of rod 91 which passes through the rear wall of the casing 15 and engages and controls the movements of the gear shifter fork 76 connected with said gears 72 and 73. Both levers 85 and 86 are provided with hollow interiors and perforated lugs near the hand engaging portions of the levers spaced apart as illustrated in Fig. 7 through which pass rods 92, 93 having connected to their upper extremities operating members 94, 95, which members together with the rods 92, 93 are normally held, against the tension of springs 96, 97, in an elevated position with the latch members 94, 95 protruding above the tops of the levers and causing the locking members 98, 99 to register with each other as indicated in Fig. 8, thus normally locking the two levers 85, 86 together for conjoint operation of the gear shift rods 89, 91, and the gears connected therewith.

In order to secure the locking function the engaging ends of the members 98, 99 are grooved and tongued as illustrated in Fig. 8 so that when these members are held at substantially the same level the two levers will be locked together so that when one is operated the other will be moved correspondingly, but the construction, is will be seen, is such that when the operator desires he may by pressing either of the latches 94, 95 downwardly against the action of their sustaining springs, cause the locking members 98, 99 to separate, thus freeing the levers and enabling each lever to be operated independently of the other for the purpose of securing one of the valuable features of operation made possible by the invention, namely, the capability of the machine to have the drive wheel or wheels or the other driving devices, when endless belt driving devices are employed, connected with the motor to drive each side of the machine correspondingly through the differential or to cause either or both of the supplementary driving shafts to be positively driven directly from the main driving shaft 25, without driving through the differential gearing mechanism thus insuring that the wheels or driving devices on both sides of the machine will be operated correspondingly when it is desired to avoid slipping, by a direct means of driving, avoiding the differential gearing.

The driving mechanism and gear shifting devices together with the braking mechanism for the supplementary driving shafts and the gear mechanism for reversing the direction of movement of the driving mechanism or gearing in relation to the motor have been sufficiently described in detail so that the mode of operation of that type of machine illustrated in Figs. 1 and 2 may now be readily understood to be as follows:

The motor being in operation, and assuming that the reversing gear lever 32 has been operated from the neutral position shown in Fig. 3 until the jaws 29ª on clutch member 29 engage the jaws 24ª on the end of the friction clutch shaft bevel gear 24, when the shaft 23 is operated with the clutch engaged, rotation in the same direction intended for normal speed ahead of the machine will be imparted to the drive shaft 25 which will normally cause the gears 80, 81 and the two pairs of slidable driving gears 72, 73 and 74, 75 to be normally rotated through the differential gearing which operatively connects the ends of the sleeves 70, 71 on which the last said gears are splined to have sliding movement from end to end thereof. By manipulating the hand levers 85, 86 conjointly, which would be done by grasping either lever with the levers in their normal conditions locked together by the locking members 98, 99 as illustrated in Figs. 7 and 8, the operator could by shifting the levers cause the rod 91 to be retracted through the wall of the casing 15 so that the spring controlled pawl 100 would engage the notch most remote from the lever 85, which would result in sliding the gear 73 into engagement with the gear 62, which is fixedly mounted on the supplementary drive shaft 54. Likewise the same movement of the levers 85, 86 would cause the rod 89 to be shifted so that the spring pressed pawl 102 would engage the notch next the cross pin 88 at the lower end of the lever 86 which movement would likewise carry the gears 74 and 75 toward the differential gearing inside of the casing and cause gear 75 to mesh with gear 61 which is fixed to the supplementary drive shaft 53. In this manner both the supplementary drive shafts 53, 54 will be positively driven through the differential gearing in the direction ahead on low speed, and it will be seen that when it is desired to shift from low speed ahead after the vehicle has reached sufficient speed to be thrown into high, the operator may in a like manner, by shifting conjointly the levers 85, 86, first, of course, having thrown out the clutch as well understood in this art, thus cause the larger driving gears 72 and 74 to engage the correspondingly smaller gears 63, 60, on the supplementary drive shafts, 53, 54 respectively. This shifting of the gears when the clutch is again engaged will obviously result in driving the machine as constructed herein, at high speed ahead.

In the simplest form of machine as shown in the two-wheel drive with front wheels 105, 106 pivotally secured at 107, 108 to axle 109 and controlled in the conventional manner through connecting rods 110 and 111 and the conventional worm operated steering gear, 112 I may make use of my invention to advantage even in steering when it is desired to turn the machine in the shortest possible radius. It will be noted from an inspection of Fig. 10 that the braking devices for engaging the brake wheels 55, 56 on the forward extremities of the supplemental drive shafts 53, 54 consist of the expansion belts 115, 116 controlled by the combined link and lever actuating devices as indicated at 117, 118 which are both connected with and operated by link 119 connected with link 120 pivoted to an arm 121 on one end of the torsion brake shaft 122 which is carried at its rear end to a point accessible to the driver at the rear of the wall of gear casing 15, where it is provided with the vertically extending hand lever 123. It will be seen that the arrangement of this brake control is such that movement of the hand lever 123 in one direction will cause one of the brake bands 115, 116 to tighten around its respective brake wheel while the brake band on the opposite wheel will be correspondingly loosened, while a movement of the lever in an opposite direction will reverse the action on the respective brake bands.

The brake bands 115, 116 are of conventional type and are held in position for operation around their respective brake drums by means of securing devices or forks 124, 125 attached on the upper sides thereof and engaged by pins 126, 127 protruding from some convenient part of the machine as the partition wall 19 of the gear casing. The operator may in turning lock one of the driving wheels 46, 47 at will by operating the brake lever 123, the arrangements of this lever and its connections with the brake mechanism being such that as lever 123 is moved to the right it will brake the wheel 47 on the right hand side of the machine by applying tension on brake drum 56, while a movement of the brake lever 123 in the opposite direction will likewise release brake drum 56 and apply the pressure to the brake drum 55, locking or braking the wheel 46 on the left hand side of the machine. When a braking action is thus exerted upon one of the driving wheels if the differential mechanism is still permitted to be operated the effect will be to cause the wheel that is free from the braking action to move forwardly and causing the machine to pivot around the point of contact of the wheel which is locked or braked as a center.

In conditions where there are slippery surfaces such as conditions of mud or ice which may involve the driving wheels on one side of the machine to greater extent than on the other, it is often highly desirable to avoid driving through the differential gearing since the action of the differential is liable, when the power is applied, to result in doubling the movement of one of the driving wheels, which is on a condition of ground surface that will allow it to slide or slip while the other wheel remains stationary. The function of my differential locking out mechanism heretofore referred to as controlled by the companion levers 85, 86 which are normally locked for conjoint operation but which may be released to operate independently, is to meet just such conditions of track surface involving one but not both sides of the machine as for example, where the wheels on one side of the machine may be in a dirt furrow in which there is water or mud while the wheels on the other side of the machine, and particularly the driving wheel or driving device may be on a condition of roadway or soil involving dry earth, rock or gravel, where if power could be applied to that wheel without the interposition of the differential it would be effective to move the machine, but sufficient power can not be supplied thereto through the differential without resulting in doubling the movement of the wheel in the slippery condition. Under such conditions, if it is desired for example, to apply all of the power of the motor to the driving wheel 46 on the left hand side of the machine of Fig. 1, the operator would be able to do so without applying any power to the driving wheel 47 on the opposite side of the machine or he might, if he thought desirable, lock out the differential mechanism and drive both wheels positively. The first method of operation would be obtained by first moving the conjointly operating gear shift levers 85, 86 to neutral position as illustrated for example, by the positions of the parts in Fig. 3. Then by pressing downwardly upon the thumb latch 94 on lever 86 it would lower the locking member 98 until this lever would be free to shift independently of lever 85 and he would then move said lever to cause the gear shifter rod 89 to be fully retracted against the action of the coil spring 130 secured thereon by the washer and pin as indicated at 131, thus causing the shifter fork 77 to bring the gear 74 within the gear 80 so that the external teeth on the gear 74 will engage the internal teeth on gear 80 and lock the gear 74 rigidly with gear 80 and with shaft 25 to which the gear 80 is keyed.

It will be seen that this movement of gear 74 would cause the teeth thereof to mesh with the teeth of the gear 60 on the supplementary drive shaft 53 controlling drive wheel 46 and that since the gear 74 is very wide, and the teeth thereon correspondingly elongated, the gear may be moved into engagement with the internal teeth in gear 80 and still remain in mesh with the teeth on the spur gear 60 thus positively driving the supplementary drive shaft 53 and the driving wheel 46 connected therewith from the main drive shaft 25 rendering the differential gear absolutely inoperative in so far as the driving wheel 46 is concerned.

The function of the spring 130 is of importance since this spring is preferably of sufficient strength to operate the gear shift lever 86 with which it is connected and to slip the gear 74 connected therewith out of engagement with gear 80 whenever the operator releases hold of the lever 86. This is of importance since it insures that as soon as the emergency has passed requiring the locking out of the differential, the positive engagement of the driving wheel on either side with the driving shaft, around the differential, will be released. It will be seen that the operation of positively connecting the driving wheel 47 on the opposite side of the machine with the drive shaft 25 would be the same through the operation of the hand lever 85 which should first be released from conjoint operation with the companion lever 86 by the operation of the hand latch 95 thereon and the consequent shifting of the rod 91 would compress the spring 132 and permit the slide gear 72 to engage the internal teeth of the gear 81, while at the same time engaging the teeth of spur gear 63 on supplementary driving shaft 54 positively driving the wheel 47 from the motor driven shaft 25. It will also be seen that the driver might by operating both levers 85 and 86 conjointly to the positions last described cause both of the driving wheels 46 and 47 through the respective driving mechanism just described, to be positively connected with the drive shaft 25 avoiding the effect of the normally interposed differential gearing. Under this last condition, particularly, it is very desirable that the returning springs 130 and 132 function properly since it might be disastrous or at least disadvantageous to the proper operation of the machine, subsequent to the emergency, should the operator forget to shift the differential lockout and restore the differential gearing to its normal functioning.

The differential locking out mechanism and the braking mechanism for controlling the operation of the driving wheels or devices on the opposite sides of the machines are further particularly advantageous when my driving mechanism is adapted to the operation of a four-wheel drive machine to which adaptation it readily lends itself as illustrated by the form of the invention shown in Figs. 11 and 12 and also in the form of the endless belt type of driving mechanism as exemplified in the modified forms of the invention shown in Figs. 15 to 17 inclusive. The braking mechanism on the supplementary drive shafts 53, 54 which I have described may also, I find, be advantageously employed in certain conditions of uncertain roadway or surface in which a driving wheel on one side of the machine may be disadvantageously located, by the application of the brake to the drum controlling the supplementary driving shaft connected with the wheel in the slippery or disadvantageous condition of soil or roadway without the necessity of locking out the differential by means of the mechanism which I have shown and described. Under these last conditions the operator by the movement of the brake lever 123 toward the wheel which is in the condition where traction is uncertain or precarious, may by braking that wheel to any degree which may be desired, cause correspondingly increased pressure or driving power to be applied to the differential or driving mechanism to the other wheel, which may be more advantageously located with respect to roadway or driving surface.

As before stated the form of my improved integral frame as shown in Fig. 1 although particularly designed for use as a two-wheel rear drive tractor may without reconstruction except for slight additions of inexpensive parts be converted into a four-wheel drive machine as illustrated in Figs. 11 and 12. Referring to the main integral frame of the machine of Fig. 1, it will be seen that opposite the low speed spur gears 61, 62 on the supplementary driving shafts 53, 54, in the walls of the casing 15 I provide openings in the regular casing as indicated by the reference characters 140 and 141 respectively, the former being simply closed by a suitable cover plate as indicated at 132 Fig. 1, when it is desired to use the frame for a two-wheel rear drive machine, and the latter being utilized as a source for supplying lubricant to a casing 112ª which is supplied on the two-wheel type of machine for supporting the gear 112, already referred to, which is preferably worm driven in a conventional manner for operating the steering gear. When it is desired to make use of the frame 15 of the machine as a component part of a four-wheel drive tractor I remove the plate 132 and the gear casing 112ª and attach to the frame 15 gear casings 145, 146 which are formed as illustrated in Figs. 11 and 12 to furnish bearings for the rear ends of drive shafts 147, 148 both of which are connected by suitable universal joints with short stub shafts not designated, which latter are journalled in suitable bearings in the casings 145, 146 and to which are rigidly secured spur gears 141ª, 142. In attaching the casing 146 to the frame near the gear 62 it will be necessary to remove the steering gear casing 112ª which I prefer to dispense with in my improved form of four-wheel drive machine, since I do not require the ordinary form of steering mechanism to control pivoted wheels or axles which are dispensed with as hereinafter described.

The drive shafts 147, 148 extend forwardly and are suitably connected to worm gears of a type as designated by the reference character 148ª, Fig. 12, which is secured to a short shaft 149 journaled in suitable bearings in casing 150, the shaft 149 forming a continuation of the shafts 147 and 148 and being suitably connected to rotate therewith through universal joints as indicated at 151, Fig. 12. The worm gears 148ª engage suitable toothed gears as indicated by the reference character 152, Figs. 11 and 12, the latter being fixed to rotate with the short axle shafts 153 journaled to rotate in the axle housing 154 which may be formed as illustrated integrally with the housing 150, and the latter is preferably formed at the outer extremity similar to the housings 41 heretofore referred to for supporting the rear axle bearings in order to prevent duplication of parts and to make it possible to utilize the same type of bearings as illustrated at 154ª in the front wheelbearings as in the rear heretofore designated by the reference characters 42 and 43. The front wheels of the four-wheel drive type of Figs. 11 and 12 are designated by the reference characters 155, 156 and are preferably similar in construction to the rear wheels 46, 47 thus avoiding further duplication of particularly designed parts in manufacture.

It will be seen that the transformation of my ordinary form of two-wheel rear drive machine as illustrated in Figs. 1 and 2 to the form of four-wheel drive of Figs. 11 and 12 will comprise practically no changes, other than those enumerated, adding the driving mechanism and replacing the front axle and wheels with the forms shown and described in connection with Figs. 11 and 12

12 with the possible exception that, should it be desired to add the power pulley analogous to that illustrated in Fig. 1 and designated by the reference character 38 on account of the location of the power shaft 148 I prefer to shift the location of the power pulley, where one is employed, but continue to take the power from the same location between the bevel gears 24, 28 by supplying a special combined spur and bevel gear in the place of gear 35 of Fig. 1, the same being designated by the reference character 160, Fig. 11, the spur gear portion thereof being adapted to engage a spur gear which I designate diagrammatically at 161, Figs. 12 and 16, the latter being mounted on some suitable depending portion not shown, of a frame or casing 162 that may be attached to the upper side of the frame 15 by removing the cover plate which is indicated by the reference character 163, Fig. 2. In the casing 162 there is journalled a shaft 164 on which is mounted a spur 165 illustrated diagrammatically in Figs. 12 and 16 and through this train of gears from the gear 160 motion is imparted to the power pulley 166 mounted on the shaft 164 on the exterior of said casing 162, thus elevating the power pulley above any possibility of interference with the drive shaft 148 of the four-wheel drive and above interference with the endless belt from all tractor driving and supporting devices when it is desired to employ the same as illustrated in Fig. 16.

I find that the braking and power transmission mechanism which I have provided lends itself admirably to the steering and controlling of a four-wheel drive of machine of the form illustrated in Fig. 12 in which the four-wheels of the machine are all positively driven and all of them mounted upon axles which are secured to the body of the machine in nonpivotal relation. Theoretically this construction would result in a machine which might be regarded as incapable of steering but I find from the practical standpoint that by means of the perfect controlling mechanism which I have provided it is possible to steer the machine, turning the same with great ease and facility and thereby resulting in a great saving of complication of parts in manufacture with a corresponding saving of upkeep and other operating expenses.

The mode of operation of the machine of the four-wheel drive type of Figs. 11 and 12, particularly with respect to the steering will be as follows:

When the machine is moving ahead the normal tendency, with slight variations of course, is for the machine to move in a straight line. Any slight deviation from such course will be obtained by a simple manipulation of the hand brake lever 123 either to the right or to the left, this lever and its connecting mechanisms with the brake bands 115, 116 being so arranged that the lever will be shifted to that side of the machine to which it is desired the machine shall turn. For example, if it be desired to deflect the tractor slightly toward the right from the straight line course, while the machine is in operation, the operator will move the lever 123 to the right which will result in tightening the band 115 on brake wheel 56, thus braking the wheel 47 and the wheel 156 operated therewith causing the wheels 46 and 155 to tend to forge ahead with the result that side pressure toward the right will be placed on the wheels 155 and 156 in particular due to the excessive weight on the rear axle, causing them to deflect the machine slightly from its straight ahead course. Obviously, a movement of the lever 123 in the opposite direction or toward the left will apply friction in the same manner upon the brake wheel 55 on supplementary drive shaft 53 and the driving wheel 46 connected therewith with the result that the driving wheels 46 and 155 on the left hand side of the machine will be retarded and the tendency of the wheels 47 and 156 on the right hand side of the machine to forge ahead will deflect the course of the machine to the left.

I find in practice with a four-wheel drive machine of the character described that steering on curves of comparatively large radius is easily accomplished by slight actuations of the braking mechanism as described, and that curves of very short radius even may be accomplished in turning under some conditions of road, particularly, where the tractor is running light. Under conditions of extremely heavy load where comparatively short turns are required, it will be apparent that the application of sufficient braking force to the driving mechanism and wheels on one side of the machine would have the effect of doubling the speed of the parts in the other side with a consequent reduction of power so that under such conditions I find that my improved form of differential locking out mechanism already described is of the highest importance in steering. Under such conditions where an abrupt turn is desired, while the machine is under heavy load I would, by the manipulation of the gear shift levers 85, 86 in the manner already described, shift the driving mechanism controlling the drive wheels on the concave side or inside of the desired turn to the inoperative position and then positively connect the driving wheels or driving devices on the convex side or outside of the curve with the power plant, with the result that the machine will turn in a satisfactory manner, which may be assisted somewhat by the braking of the wheels on the inside or concave side of the curve which are rendered inoperative.

Another important feature of my invention resides in the facility with which the speeds of the driving wheels on the opposite sides of the machine may be varied by shifting the individually operating control levers 85, 86 to positions indicating different speeds. For example, if the machine equipped either with the carrying wheels as in Figs. 1 and 11 or when equipped with the endless belt traction devices as in Figs. 15 and 16 have the control levers 85 and 86 shifted either in high or low speed when the clutch is in, obviously the machine will travel in a right line ahead, as already described. I find that the machine may be conveniently turned, but in a curve of course of fixed radius, except as it may be varied by the use of the breaking mechanism described by shifting the lever controlling the transmission gears on one side or the convex side of the curve to high speed, and at the same time shifting the lever controlling the transmission gears on the other side of the machine to the low speed. Such shifting may be done by first setting the gears on both sides in low speed ahead, the clutch being out and after the machine is in motion shifting one of the levers to high speed; or the same result may be secured when the machine is in motion on high speed by first throwing out the clutch and shifting the lever controlling the gears on the desired side to low speed and letting in the clutch, which will result in the machine being moved in a curve of the described radius, which as stated, may be varied by the application of the breaking mechanism as heretofore described. I find that the last described method of controlling by the use of variable speeds on different sides of the machine is particularly applicable and advantageous when the tractor is equipped with the endless belt traction devices.

In Figs. 15 to 17 inclusive I show the machine of the form of Fig. 1 consisting of the motor and the main frame and the power transmission devices with the driving wheels replaced by driving mechanism of the endless belt type, showing that in the use of my improved power transmission mechanism only small and inconsequential changes from the standpoint of manufacturing cost would be necessary to adapt the main frame and the operating parts connected therewith to this last said type of machine. The front axle of the machine of Fig. 1 will be replaced by cross bar 170 to which I would connect at its extremities the side bars 171 and 172, the latter being pivoted at their rearmost extremities to the axles 17 and 18 extended, the latter having secured thereto suitable toothed driving wheels as indicated by the reference character 173, and being adapted to support and drive an endless belt form of track designated generally by the reference character 174.

A flexible connection will preferably be secured between the forward extremities of the side bars 171, 172 and the front cross bar 170 by the interposition of cushion springs 180, 181 held in position by suitable guide bolts, as illustrated, and near the forward extremities of the side bars 171, 172 I would provide a suitable housing or opening as indicated at 184 for supporting longitudinal moving bearing blocks as indicated at 185, supporting wheels 186 adapted to carry the endless belt track devices 174 at the forward ends of the runs thereof, the blocks 185 being preferably held by rods or bolts as indicated at 187 so that the blocks 185 may be under pressure by springs as indicated at 188 to exert suitable tension on the endless belt driving devices, holding the same taut during its operative movements, while being driven by the wheels 173, to which the driving power will be applied. The endless belt driving device or track 174 is of a conventional form, and obviously any common form of track employed in this class of machines may be used to advantage, for I find that my improved power transmitting and controlling devices are admirably adapted to machines of this character, in which obviously, the steering must be obtained by a differential movement between the driving devices on the two sides thereof. In driving the machine of the type of Figs. 15 to 17 the manner of control will not differ substantially from that already described with respect to my improved four-wheel type of machine, since it will be apparent that the wheels connected in pairs on the two sides of that machine might be provided with endless track devices and operated in the manner described without further modification, except to provide means for retaining the endless belts under tension on said wheels.

In the application of my invention to motor driven vehicles of either the two-wheel or four-wheel drive type as illustrated for example, in Figs. 1 to 15 inclusive, the front axles 109 and 154 which are shown as flexibly connected to the front of the engine frame may be suitably braced by the stay rods 210, 211 and 212, 213 connected to the underside of the engine frame and diverging forwardly to the respective front axles where they may be connected as illustrated in Figs. 1 and 11.

Another important and improved detail of construction resides in the draft mechanism which I provide at the rear end of the machine for the attachment of loads or farm implements. This consists of a U-shaped member or bail 204 pivotally connected at its forward extremities as shown, for example, in Figs. 4, 12 and 15 to depending branches 202, 203 formed integrally on the underside of the bell housings 40, 41 respectively for supporting the rear axle bearings. On the upper sides of these bell housings other integral branches 200, 201 are formed and these like the depending members 202, 203 may be provided with a plurality of holes as illustrated for example, in Fig. 12, so that not only the bail or draft member 204 but also the links 205, 206 may be connected with the respective bell housings for the purpose of adjusting the draft device or bail 204 in a plurality of positions of vertical adjustment.

Heretofore it has been common to connect the draft devices to lugs or branches formed integrally on the machine frame with the result that when excessive and unusual strains occur breakages often result requiring the replacement of large and expensive parts or the making of repairs that are expensive. By my improved construction in this draft device any breakage likely to occur would not involve more than the replacing of one of the bell housing castings 40 or 41.

In order that the invention might be understood the details of the preferred embodiment thereof have been set forth, but it is not desired to be limited to the details thereof, for it will be apparent that persons skilled in this art may resort to various modifications of the details of the invention as set forth, without departing from the purpose and spirit thereof.

I claim:

1. A motor vehicle comprising a motor frame and a frame for carrying power transmission devices, both of said frames being rigidly connected together, a pair of driving wheels, a pair of power transmitting shafts rotatably mounted on separated axes and being operatively connected with the driving wheels, a differential gearing device interposed between the power transmitting shafts and being operably connected with the motor, the said differential gearing device being arranged on a substantially horizontal axis at right angles to the common axis of the said driving wheels, a pair of supplementary supporting wheels, and means for driving the last said wheels comprising gearing detachably connected to the exterior of the power transmission casing and operably connecting said wheels with said power transmitting shafts.

2. In a motor vehicle the combination with a motor, a pair of separated driving wheels, a pair of separated driving shafts operatively connected with and having their axes angularly arranged to the axes of driving wheels, a shaft driven from the motor, differential gearing operatively connected with said motor driven shaft, a pair of spur gears connected with variable parts of said differential, there being one of said spur gears having operative connections with corresponding gears on each of said separated driving shafts, a pair of supplementary driving wheels spaced apart from first said driving wheels, and detachable gearing interposed between said supplementary driving wheels and said separated driving shafts.

3. In a motor vehicle, the combination of a motor, a pair of separated driving wheels, a pair of separated driving shafts operatively connected with and having their axes angularly arranged to the axes of said driving wheels, a shaft driven from the motor, differential gearing operatively connected with said motor driven shaft, a pair of spur gears connected with variable parts of said differential, there being one of said spur gears having operative connections with corresponding gears on each of said separated driving shafts, a pair of supplementary driving wheels spaced apart from the first said driving wheels and detachable driving means interposed between said supplementary driving wheels and said spur gears on said separated driving shafts and comprising spur gears engaging each of said spur gears on the supplementary driving shaft, and power transmission shafts connected therewith and having operative connection with said supplementary driving wheels.

4. In a motor vehicle, the combination with a motor shaft, of a power transmission shaft arranged coaxially therewith and independently rotatable in relation thereto, a bevel gear connected to rotate with the motor shaft, a bevel gear journalled on the power transmission shaft and rotatable independently thereof, clutch teeth on the adjacent faces of each of said bevel gears, driving teeth on the adjacent faces of said bevel gears, a power pulley, a shaft for said power pulley, a bearing for said shaft, and a bevel gear secured to said shaft and having the teeth thereon meshing with the teeth on said bevel gears on the motor shaft and power transmission shaft respectively.

5. In a motor vehicle, the combination with a motor shaft having a bevel gear thereon, a power transmission shaft mounted to rotate coaxially with and independently of said motor shaft, a second bevel gear mounted to rotate independently on said power transmission shaft and having the driving teeth thereon spaced apart from the driving teeth on the bevel gear on said motor shaft, clutch teeth on the adjacent faces of said bevel gears, a power pulley, a driving shaft therefor, a bevel gear on said power pulley driving shaft meshing with said gears on the motor shaft and power transmission shaft respectively, a clutch member connected to rotate with said power transmission shaft and being adapted to slide thereon between the clutch teeth on the adjacent faces of said bevel gears on the motor and power transmission shafts there being clutch teeth on said clutch members, and means for moving said clutch member longitudinally of said shaft.

6. In a motor vehicle, the combination with a motor shaft, having a bevel gear operatively connected thereto, a power transmission shaft coaxial with said motor shaft and rotatable independently thereof, a second bevel gear mounted to rotate independently on said power transmission shaft and being provided with gear teeth opposing corresponding teeth on the first said bevel gear a third bevel gear having teeth meshing with the aforesaid bevel gears and being rotatably mounted on an axis angular to the axes of the aforesaid bevel gears, a clutch member being slidably mounted on said power transmission shaft and secured to constantly rotate therewith, clutch teeth on said bevel gears on the motor and power transmission shafts respectively, clutch teeth on said member adapted to engage the clutch teeth on the last said bevel gears, and means for operating said clutch member.

7. In a driving mechanism for motor vehicles, the combination with a motor, of a shaft driven from the motor, there being suitable intermediate mechanism for transmitting motion from the motor to said shaft to operate the said shaft in direct and reverse movements and also for connecting and disconnecting the said shaft from the motor, a plurality of separated driving shafts having their axes approximately parallel to the axis of the first said shaft, and being operatively connected each with an independently rotatable driving wheel, a differential gearing device interposed between the said shaft driven from the motor and each of said separated driving shafts, spur gears attached to the respective variable parts of the differential and mounted coaxially on the first said shaft, spur gears secured to the separated driving shafts and engaging the said spur gears on the differential, brake wheels on each of the said separated driving shafts, brake bands cooperating with said brake wheels pivoted levers connected with said brake bands for controlling same, and mechanism for operating said pivoted brake band levers comprising a lever moving at right angles to the normal direction of travel of the driving wheels over the roadway or surface on which the said motor vehicle is to be operated and a link connecting the last said lever with the aforesaid brake band levers.

8. In a motor vehicle the combination with a motor and separated driving means for supporting and moving the motor vehicle, of a pair of separated driving shaft operatively connected with and having their axes angularly arranged to the axes of said vehicle driving device, a shaft driven from the motor, differential gearing operatively connected with said motor driven shaft, a pair of spur gears connected with variable parts of said differential, there being one of said spur gears having operative connections with corresponding gears on each of said separated driving shafts, a pair of internally toothed gears each secured to the said motor driven shaft to rotate constantly therewith adjacent the said spur gears on the separated driving shafts, the said spur gears connected with the variable parts of the differential being longitudinally movable to operatively engage said gears on the separated driving shaft and when shifted under the control of the operator to engage synchronously the said spur gears on the separated driving shafts and the internally toothed gears on said motor driven shafts, and means under the control of the operator for adjusting said gears on the motor driven shaft longitudinally thereof.

9. In a motor vehicle the combination with a motor driven shaft, of differential gearing coaxially mounted thereon and operatively connected therewith, comprising longitudinal sleeves surrounding said motor driven shaft and having the variable gears of the differential gearing device connected therewith, a spider connected with the motor driven shaft and carrying a plurality of gears engaging the said variable gears, internally toothed gears secured to the motor driven shaft at the extremities of the aforesaid sleeves mounted thereon, a pair of supplemental driving shafts spaced apart on opposite sides of said motor driven shaft and having spur gears secured thereto, a pair of spur gears slidably mounted on said sleeves on the motor driven shaft, said last mentioned spur gears being adapted to engage synchronously the said spur gears on the supplemental driving shafts and the internally toothed gears secured to the motor driven shaft, and means under the control of the operator for longitudinally moving the said gears on the said sleeves.

10. In a motor vehicle the combination with a motor driven shaft, of differential gearing coaxially mounted thereon and operatively connected therewith, comprising longitudinal sleeves surrounding said motor driven shaft and having the variable gears of the differential gearing device connected therewith, a spider connected with the motor driven shaft and carrying a plurality of gears engaging the said variable gears, internally toothed gears secured to the motor driven shaft at the extremities of the aforesaid sleeves mounted thereon, a pair of supplemental driving shafts spaced apart on opposite sides of said motor driven shaft and having spur gears secured thereto, a pair of spur gears slidably mounted on said sleeves on the motor driven shaft, said last mentioned spur gears being adapted to engage synchronously the said spur gears on the supplemental driving shafts and the internally toothed gears secured to the motor driven shaft, means under the control of the operator for shifting said gears on said sleeves into synchronous engagement with said spur gears on said supplemental driving shafts and said internally toothed gears on said motor driven shaft, and spring means for automatically restoring said last mentioned means to normal when released by the operator, whereby the said gears on the sleeves of the motor driven shaft will be automatically released from contact with said internally toothed gears.

11. In a motor vehicle the combination with a motor of a motor driven shaft, a differential gearing device mounted upon and arranged coaxially of said motor driven shaft, a pair of supplemental driving shafts, spur gears on the last said shafts, gears connected with variable parts of said differential gearing device engaging gears on said supplemental driving shafts, and means for locking out the differential gearing device and operating the spur gears thereon to positively separate the said gears on the supplemental driving shafts.

12. In a motor vehicle the combination with a motor, of a motor driven shaft, a differential gearing device on said motor driven shaft, a pair of sleeves rotatably connected with variable parts of said differential gearing device encircling said motor driven shaft, a pair of separated supplemental driving shafts, a pair of separated driving wheels, a pair of separated axles for operating said wheels, gearing interposed between said supplemental driving shafts and said axles, a pair of spur gears of different sizes secured to each of said supplemental driving shafts in spaced relation thereon, the said pair of gears on each shaft being arranged on opposite sides of said differential gearing device on the motor driven shaft and in proximity to the said sleeves connected with the differential gearing device, a pair of connected spur gears of different sizes mounted to move longitudinally of said sleeves on the motor driven shaft, and means under the control of the operator for moving said gears on the motor driven shaft into and out of engagement with said spur gears on the supplemental driving shafts.

13. In a motor vehicle, the combination with a motor, a pair of separated driving wheels, a pair of separated driving shafts operatively connected with said driving wheels, differential gearing driven from the motor, a sliding spur gear on each of the variable parts of the differential, a spur gear on each of the said separated driving shafts, means for causing said sliding spur gears to engage or disengage said spur gears on the driving shafts, comprising a pair of levers each of which is operatively connected with one of the sliding spur gears on the differential, and means for locking said levers together for synchronously shifting said sliding spur gears.

14. In a motor vehicle, the combination with a motor, a pair of separated driving wheels, a pair of separated driving shafts operatively connected with said driving wheels, differential gearing driven from the motor, sliding spur gears rigidly connected together in pairs on each of the variable parts of the differential, the said gears in each pair being of different sizes, a pair of spur gears on each of said separated driving shafts of different sizes corresponding to the gears on the differential, and means for causing said sliding spur gears to engage or disengage said spur gears on the driving shafts.

15. In a motor vehicle, the combination with a motor, a pair of separated driving wheels, a pair of separated driving shafts operatively connected with said driving wheels, differential gearing driven from the motor, sliding spur gears rigidly connected together in pairs on each of the variable parts of the differential, the said gears in each pair being of different sizes, a pair of spur gears on each of said separated driving shafts of different sizes corresponding to the gears on the differential, and means for causing said sliding spur gears to engage or disengage said spur gears on the driving shafts comprising a pair of levers each of which is operatively connected with one of the sliding spur gears on the differential.

16. In a motor vehicle, the combination with a motor, a pair of separated driving wheels, a pair of separated driving shafts operatively connected with said driving wheels, differential gearing driven from the motor, sliding spur gears rigidly connected together in pairs on each of the variable parts of the differential, the said gears in each pair being of different sizes, a pair of spur gears on each of said separated driving shafts of different sizes corresponding to the gears on the differential, means for causing said sliding spur gears to engage or disengage said spur gears on the driving shafts comprising a pair of levers each of which is operatively connected with one of the sliding spur gears on the differential, and means for locking said levers together for synchronous shifting of said sliding spur gears.

17. In a motor vehicle, the combination with a motor, a pair of driving wheels, a pair of separated driving shafts operatively connected with said driving wheels, a power transmitting shaft intermediate the driving shafts, differential gearing driven from the motor, a sliding spur gear on each of the variable parts of the differential, a spur gear on each of the said separated driving shafts, means for causing said sliding spur gears to engage or disengage said spur gears on the driving shafts, and means for locking the sliding spur gears to the power transmitting shaft.

18. In a motor vehicle, the combination with a motor, a pair of driving wheels, a pair of separated driving shafts operatively connected with said driving wheels, a power transmitting shaft intermediate the driving shafts, differential gearing driven from the motor, a sliding spur gear on each of the variable parts of the differential, a spur gear on each of the said separated driving shafts, means for causing said sliding spur gears to engage or disengage said spur gears on the driving shaft, and means for locking one of the sliding spur gears to one of the power shafts independently of the other of the spur gears.

19. In a motor vehicle, the combination with a motor, a pair of separated driving wheels, a pair of separated driving shafts operatively connected with said driving wheels, differential gearing driven from the motor, a sliding spur gear on each of the variable parts of the differential, a spur gear on each of the said separated driving shafts, means for simultaneously causing both of said sliding spur gears to engage the spur gears on both of said driving shafts and means for independently causing either of said sliding spur gears to engage its co-operating spur gear on said driving shaft.

20. In a motor vehicle, the combination with a motor, a pair of separated driving wheels, a pair of separated driving shafts operatively connected with said driving wheels, differential gearing driven from the motor, a sliding spur gear on each of the variable parts of the differential, a spur gear on each of the said separated driving shafts, a lever for moving one of said sliding spur gears into engagement with one of said spur gears on the said driving shafts, a lever for moving the other of the said sliding spur gears into engagement with the other of the spur gears on the said driving shafts, and means for interlocking said levers in such manner as to cause them to move in unison.

In testimony whereof I have signed my name to this specification, in the presence of two subscribing witnesses, on this 31st day of July A. D. 1919.

EDMUND JOSEPH KANE.

Witnesses.
ARTHUR L. SPRINKLE,
VERA FORSLUND.